INVENTOR.
JOHN F. CAMPBELL
BY
Oberlin & Limbach
ATTORNEYS.

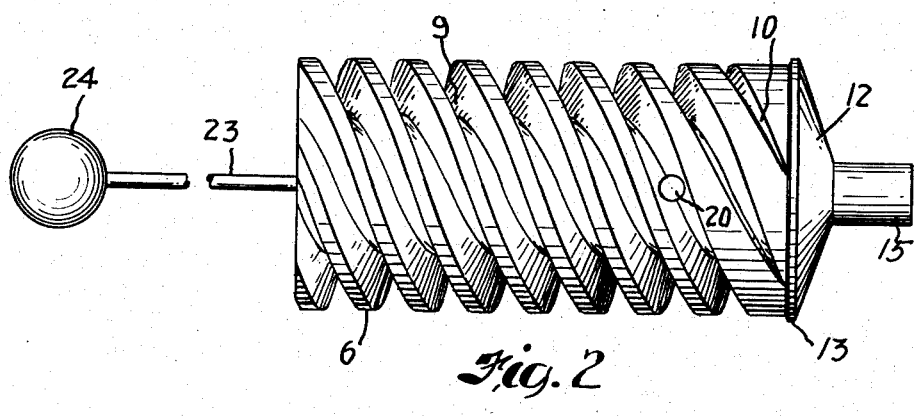
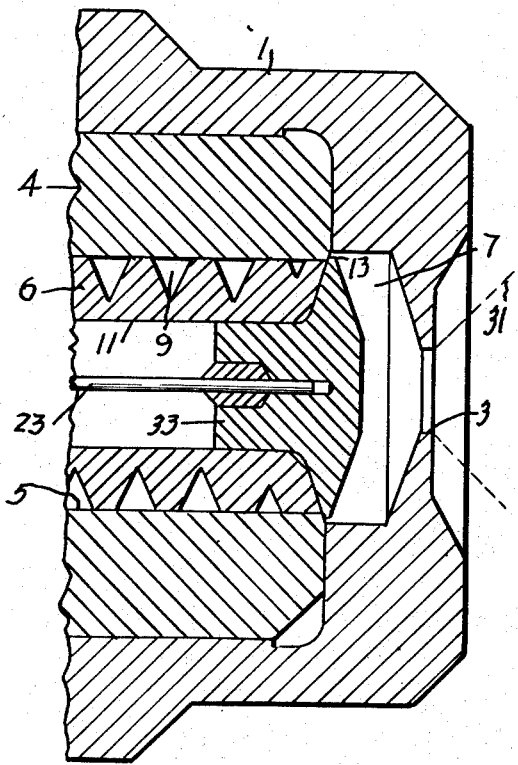
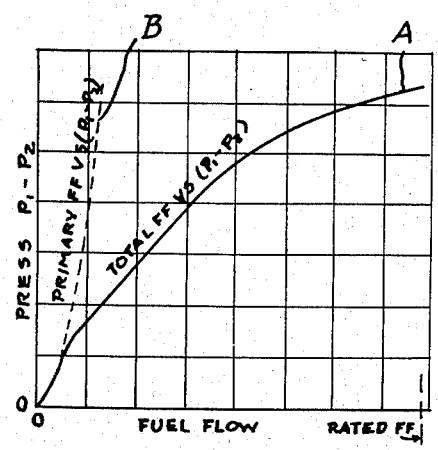

Aug. 6, 1957  J. F. CAMPBELL  2,801,881
OPEN ORIFICE NOZZLE AND VALVE
Filed March 23, 1956  3 Sheets-Sheet 3

INVENTOR.
JOHN F. CAMPBELL
BY
Oberlin & Limbach
ATTORNEYS.

United States Patent Office 2,801,881
Patented Aug. 6, 1957

2,801,881
OPEN ORIFICE NOZZLE AND VALVE

John F. Campbell, Euclid, Ohio

Application March 23, 1956, Serial No. 573,502

26 Claims. (Cl. 299—118)

This invention relates as indicated to a novel nozzle construction, and more particularly to an open orifice spray nozzle especially adapted for the injection of liquid fuels into the combustion chambers of various types of engines.

The nozzle of the present invention is especially suitable for use in gas turbine and ram-jet engines which at the present time are chiefly employed in aircraft and air-borne missiles. In the future, however, it is contemplated that engines of these types will be utilized in the automotive, railroad and marine fields. Broadly speaking, however, my new nozzle may be employed in most engines utilizing liquid fuels delivered thereto at a steady rather than a pulsating rate of flow.

Various nozzles of the open orifice type are presently employed in gas turbine and ram-jet engines but stand in need of considerable improvement to afford increased flow range, lower maximum operating pressures, a truly fine atomization of the spray and a simpler supply system. Such nozzles presently employed may be classified as "simplex", "duplex" and "dual cone" types. The usual simplex nozzle is provided with a set of constant area tangential swirl slots leading into a spin chamber having a fixed diameter exit orifice, and its flow range is limited to about 10 to 1. The duplex nozzle employs two sets of constant area swirl slots discharging into a common spin chamber which in turn discharges through a single orifice. The flow circuits leading to such two sets of slots are entirely separate upstream of the junction in the spin chamber and accordingly require a high and low pressure manifold supply system. A modulating control valve is employed with such supply systems to establish the flow rate schedules in the separate supply systems and a flow range of 18 to 1 is about the maximum feasible with this nozzle. The dual cone nozzle differs principally from the duplex nozzle in that it has separate and distinct spin chambers and constant diameter open exit orifices. It requires the same kind of dual supply system as the duplex nozzle and has a maximum flow range only slightly greater than that of the duplex nozzle.

An object of my invention is to provide a nozzle having a single supply inlet and requiring only the simplest type of supply system.

Another object is to provide such nozzle in which a flow range of 100 to 1 can easily be obtained, with even a greater range being feasible if desired.

A further object is to provide variable area secondary swirl slots within the nozzle arranged to discharge directly tangentially into a secondary spin chamber to achieve more efficient use of the supply pressure, assisting in making it possible to achieve satisfactory atomization while at relatively low supply pressure.

Still another object is to provide such nozzle having a secondary system capable of providing fine quality atomization at an unusually low percentage of flow together with a primary system capable of giving fine quality atomization up to and beyond the nominal 6% of rated fuel flow where the secondary system is capable of taking over.

It is accordingly possible to obtain finer atomization at low flow rates with high viscosity fuel, as when operating at extremely low temperatures.

Yet another object is to provide such nozzle in which there is no danger of sticking or hysteresis when operating with contaminated fuel.

A further object is to provide a nozzle of simplified construction wherein the function of flow splitting and variation of the secondary swirl slot area is achieved in one single part.

Other desirable characteristics of my new nozzle include:

(a) Fine atomization with short penetration;
(b) Low supply line pressure at rated flow;
(c) Uniformity of composition of spray cone;
(d) Ability to perform well on high viscosity fuel such as JP-5 at −65° F.;
(e) Ability to operate without change in calibration for 1,000 hours operation on normal clean fuel and 150 hours on contaminated fuel between overhauls;
(f) Ability to match performance on a mass production basis within plus or minus 2% flow variation from a master schedule.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 2 is a view of the valve member of Fig. 1;

Fig. 3 is a fragmentary longitudinal section corresponding to Fig. 1 but showing a simpler form of valve member;

Fig. 4 is a graph illustrating the general operating characteristics of my new nozzle;

Figure 1:
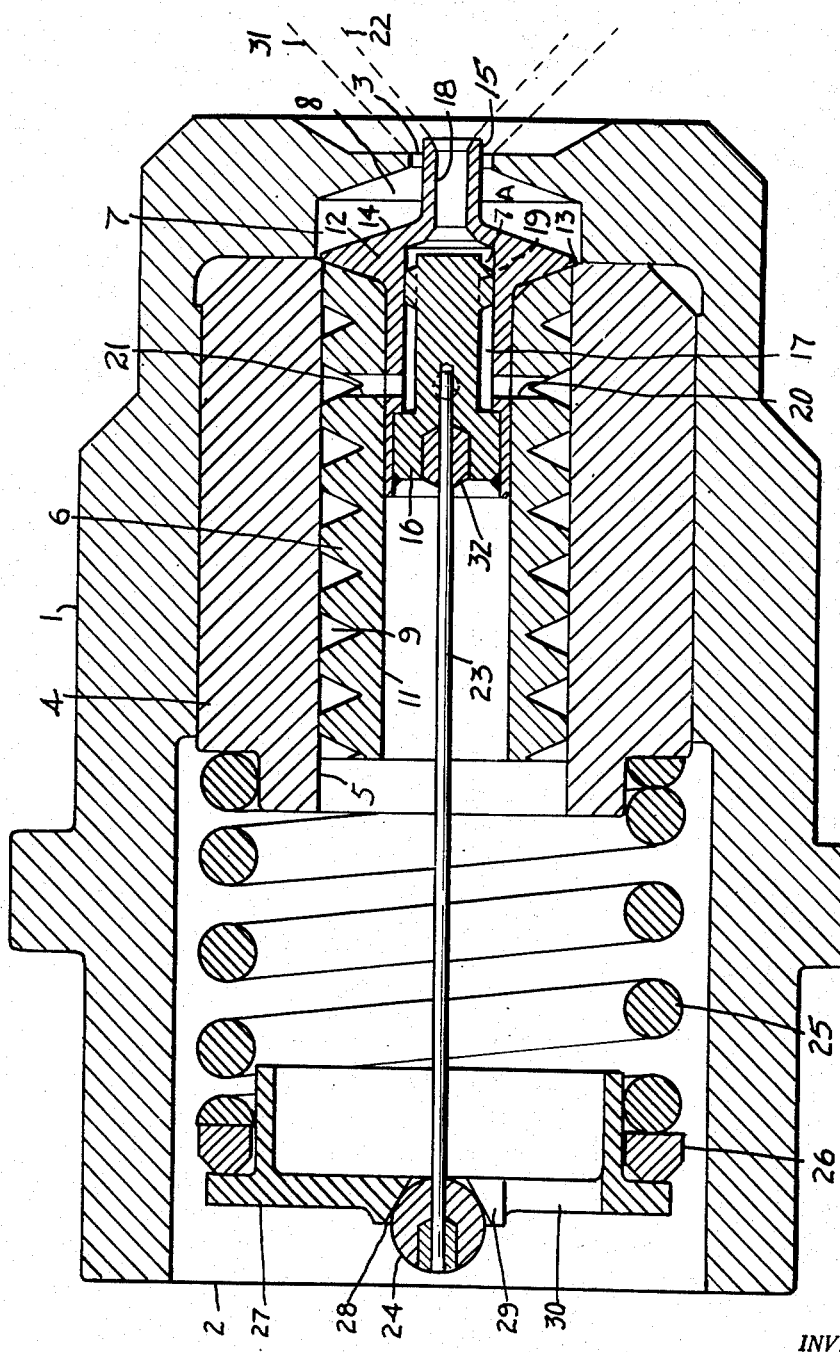
Fig. 1 is a longitudinal section through a nozzle embodying certain principles of my invention.
Figure 5:
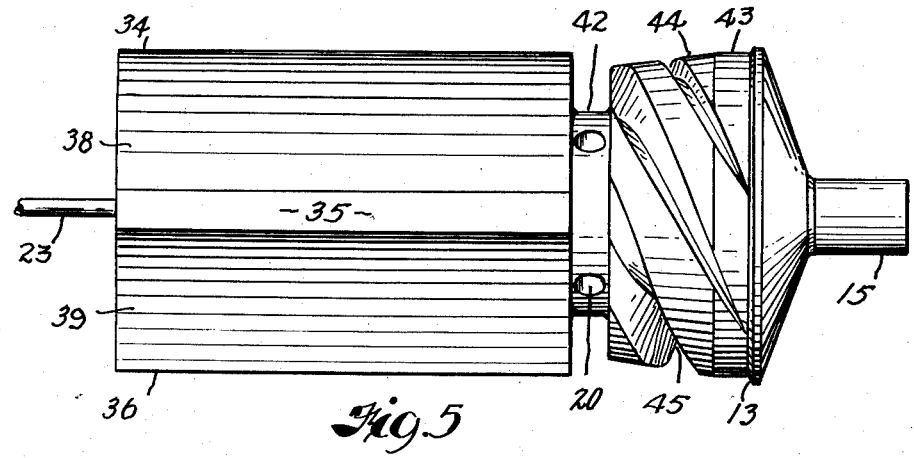
Fig. 5 shows a valve member in some respects resembling that of Figs. 1 and 2 but modified in other respects.
Figure 6:
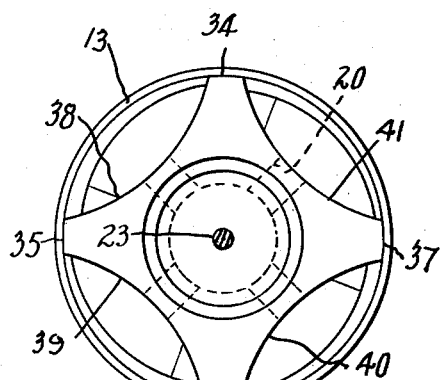
Fig. 6 is an end view of the valve member of Fig. 5.
Figure 7:
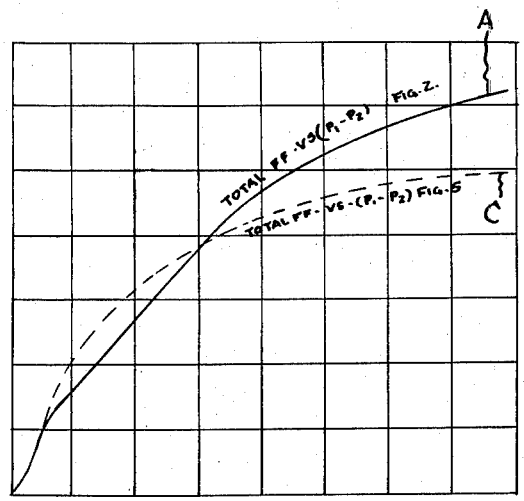
Fig. 7 is a graph similar to Fig. 4 contrasting the operating characteristics of the nozzles utilizing the Fig. 2 and Fig. 5 valve members, respectively.
Figure 8:
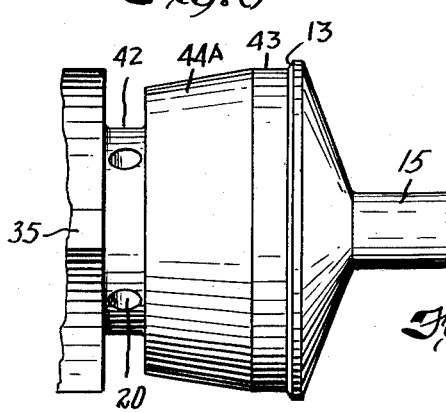
Fig. 8 is a fragmentary view of a modified valve member basically similar to that of Fig. 5.

In my prior Patent No. 2,656,218 and in my pending applications Serial No. 451,371 filed August 23, 1954, now Patent No. 2,757,968, Serial No. 351,287 filed April 27, 1953, and Serial No. 333,569 filed January 27, 1953, now Patent No. 2,749,182, I disclose and claim certain closed orifice type nozzles which are very efficient in operation and have several important advantages when utilized to deliver fuel to jet engines and the like. The embodiment of my present invention illustrated in Figs. 1 and 2 of the drawing is of relatively simple and inexpensive construction but nevertheless achieves certain of the more desired objectives in a very satisfactory fashion. Referring now more particularly to these two figures, the embodiment of my invention there illustrated comprises an outer generally cylindrical housing or body 1 adapted to be connected with an appropriate manifold for delivery of fuel to its open end 2. A restricted axially disposed exit orifice 3 is provided in the other end of such body through which the nozzle spray is adapted to be discharged. An inner cylindrical sleeve or liner 4 is press-fitted within body 1 and provides a cylindrical inner bore 5, co-axial with exit orifice 3, within which valve member 6 is adapted to be fitted for axial reciprocation. Such bore 5 is of slightly less diameter than that of spin chamber 7 with which it communicates, the other end of such spin chamber having a tapering or frustoconical surface 8 sloping toward the cylindrical exit orifice 3.

Valve member 6 is of general cylindrical form but has a plurality of helical grooves 9 (in this case four) extending the length of its outer peripheral surface, such grooves being of uniform disposition and cross-section except in their end portions 10 approaching swirl chamber 7 (their right-hand ends as viewed in Figs. 1 and 2) where they gradually taper and end. Valve member 6 itself has an inner bore 11 within which is press-fitted a primary valve body 12 having an end portion protruding into swirl chamber 7 with a peripheral flange 13 extending slightly diametrically beyond the periphery of valve member 6 but spaced somewhat from the outer peripheral wall of spin chamber 7. Such flange or lip 13 is accordingly adapted to seat against the shoulder formed by liner 4 adjacent such spin chamber. The end face 14 of valve body member 12 is a frusto-conical surface parallel to surface 8. It will be apparent that when valve member 6 is shifted to the right from its Fig. 1 position, fluid entering the valve body at 2 will be enabled to flow along helical grooves 9 and escape past peripheral valve face 13 into spin chamber 7 and thence out through exit orifice 3.

Valve body member 12 has an axial cylindrical extension 15 adapted to extend axially through exit orifice 3 defining a cylindrical annular passage therebetween. Member 12 also has an inner cylindrical co-axial chamber within which is press-fitted and welded generally cylindrical element or plug 16 closing the inner (left-hand) end of such chamber and providing an annular space 17 which communicates with inner axial passage 18 in extension 15 through helical grooves 19. Four radial passages such as 20 and 21 connect annular chamber 17 with each of the four helical grooves 9 so that at all times, even when peripheral valve face 13 is seated, a certain amount of fluid flow is permitted through such grooves 9, passages such as 20 and 21, chamber 17, swirl slots 13, and terminal passage 18 producing the inner spray cone 22. Such radial passages such as 20 and 21 are uniformly symmetrically located both axially and circumferentially of the nozzle so that the fluid flow from the grooves 9 into annular chamber 17 will likewise be uniform and symmetrical.

A straight slender spring wire member 23 is secured in member 16 as by welding and extends axially a substantial distance within the nozzle body terminating in ball 24 to which it is likewise welded. A preloaded compression spring 25 is co-axially seated on liner 4 and bears against an adjustment shim 26 mounted on movable seating member 27. Such latter member is provided with a central opening and conical seat 28 adapted to support ball 24, such seat being slotted at 29 to permit lateral movement of spring member 23 so that ball 24 may pass through large opening 30 in conventional manner when it is desired to assemble or disassemble the component parts. Spring 25 may, if desired, be a multi-coil spring machined from bar stock as shown and described in my aforesaid application Serial No. 333,569. This type of spring has no tendency to cant when compressed and therefore ensures accurate central positioning of connector rod 23. When produced in reasonably large quantities, such machined springs are also relatively inexpensive when it is of importance that the springs of a large number of nozzles should be closely matched to ensure uniform operating characteristics.

The manner of operation of the above-described nozzle may now readily be understood. Fuel from the supply system enters the nozzle body at 2 and flows through helical grooves 9 and passages such as 20 and 21 with negligible resistance and reduction in pressure. To reach the inner spin chamber 7A upstream of passage 18, the fuel then passes through a plurality of constant area helical swirl slots 19 formed in the surface of part 16, the area of such slots being selected to afford a tangential component of velocity in spin chamber 7A of sufficient magnitude at the lowest operating flow rate to ensure good atomization of the fuel in the primary hollow spray cone 22 as the thinning film of fuel emerges from the orifice of passage 18. The nominal flow capacity of the primary system thus described is, however, only a small fraction of the total capacity of the nozzle and may be designed for delivery of the entire flow up to about one-sixth of the pressure associated with the rated flow capacity of the nozzle.

When the inlet pressure bearing against valve member 6 and the associated parts integral therewith (together forming a composite valve member adapted to be reciprocated as a unit) reaches a sufficiently high figure to overcome the preload of spring 25, peripheral valve face 13 will be raised from its seat against the end of liner 4, the distance between the valve face 13 and such seat being directly proportional to the magnitude of the force referred to spring 25. As soon as a gap occurs, fuel will flow through the multiple helical grooves 9 to spin chamber 7 past such valve face and will emerge from nozzle orifice 3 in a secondary hollow spray cone 31. In view of the tapering end portions 10 of such grooves 9, it will be observed that as the gap widens, the area of the grooves uncovered at the valve seat increases. Such rate of change of groove area with respect to the magnitude of the gap may be varied as desired to obtain either a lineal or non-lineal relationship by correspondingly varying the degree of taper, depending on the particular nozzle performance specification to be met. With this freedom of selection, the designer can choose a small area at small gaps and a large area at large gaps and thus obtain a total fuel flow relationship to pressure similar to that shown by line A on the graph of Fig. 4 whereas such relationship afforded by the primary system (spray cone 22) is illustrated by the steeply ascending line B on such graph.

The spring wire connector rod 23 is bonded to the valve member as by means of silver solder 32 since this is the location of the focal point of the hydraulic forces imposed on the valve member by reason of the fluid flow through helical slots 9. Such location of attachment of rod 23 (approximately midway of the axial extent of valve member 6) affords minimum leverage for any slightly off-center force which might be transmitted by the connector rod and accordingly minimizes sliding frictional force between member 6 and bore 5. It is also well established that the resistance to sliding is less when member 6 is also permitted to rotate slightly about its axis, and connector 23 is therefore made of sufficient length readily to permit a small degree of angular motion of member 6 about its axis simultaneously with its sliding motion, such angular motion being achieved through torsion of rod 23. It will be understood that the helical path of the fuel as it passes through channels 9 and 19 establishes a considerable force effective thus to twist connector 23.

Multiple grooves 9 are uniformly arranged as above described to ensure a spray cone of uniform circumferential intensity and also to achieve hydraulic balance of the moving parts. Likewise, the different grooves 9 should be uniform in cross-section to achieve a related uniform hydraulic force pattern.

It is well known in the art that extremely small but hard and abrasive foreign particles exist in considerable concentration in practically all commercial fuels and that these particles cause appreciable friction when they enter the clearance between sliding parts. Inasmuch as the fluid pressure in each of the helical grooves will be the same, there is no pressure differential available to drive such abrasive particles into the clearance film normally existing between bore 5 and the lands intermediate grooves 9. On the contrary, there is a strong impelling velocity in pressure effective to keep such abrasive particles moving rapidly along such spiral grooves to the point of release in spin chamber 7. Tests of this nozzle utilizing heavy contaminated fuel have established that hysteresis or sticking of the moving parts is avoided.

The length of passage 18 leading to the primary exit orifice for spray cone 22 may be selected to maintain the primary and secondary spray cones separate or to cause them to join and merge at a selected distance beyond such orifice. The distance between the primary orifice of passage 18 and the secondary orifice 3 will increase with increase in flow capacity above the one-sixth pressure value previously referred to, this relationship having been found to be most desirable in practice. If desired, however, such relationship may be reversed simply by shortening extension 15 and passage 18 so that the orifice of such passage lies upstream of secondary orifice 3.

Now referring to Fig. 3 of the drawing, where the lowest operating fuel flow is to be approximately 6% or more of the rated fuel flow, it is possible to achieve quite good atomization over the entire flow range without the use of a separate primary flow system. Accordingly, a solid plug 33 may be inserted and press-fitted within bore 11 of valve member 6, having a peripheral valve face 13 as above and a contour within swirl chamber 7 generally complementary to the opposed end face of the latter, there being no extension 15. This is possible since the spring preload is then sufficient to retain fuel in the nozzle until the fuel pressure is great enough to ensure a sufficiently high velocity to achieve adequate atomization as the swirling fuel escapes from orifice 3. The valve member must reciprocate a certain minimum distance to afford a gap behind valve face 13 of sufficient size, and likewise a minimum cross-sectional area of the swirl slots 9 must be exposed before the velocity of the fuel in spin chamber 7 will become effective to create a finely atomized spray sheaf 31. These conditions normally occur at a minimum of approximately 6% of rated flow as noted above.

It is often very desirable to be able to employ high fluid pressures at low flow rates in order to assist in obtaining good atomization of high viscosity fuels and the modified form of valve member illustrated in Figs. 5 and 6 is particularly efficient in this respect. Such composite valve member is generally similar to that of Figs. 1 and 2, differing therefrom in two principal features. Instead of providing a relatively lengthy series of helical grooves 9, the rearwardly extending portion of the valve member comprises four lands 34, 35, 36 and 37 separated by wide scallops or grooves 38, 39, 40 and 41, such longitudinally extending lands slidingly fitting within bore 5 and such scallops or grooves affording unrestricted fluid flow to annular groove 42 from which the radial passages such as 20 conduct a portion of the fluid flow to the inner or primary swirl chamber and outlet through extension 15, as in the case of the Fig. 1 embodiment.

In the region between annular groove 42 and peripheral valve face 13, the valve member comprises a cylindrical portion 43 adjacent such valve face and a frusto-conical portion 44 tapering from such cylindrical portion toward groove 42. A plurality of uniformly distributed similar grooves 45 extend from annular groove 42 helically of frusto-conical surface 44 and cylindrical surface 43, gradually tapering to their ends adjacent valve face 13.

It must be appreciated that nozzles for the purposes here in mind are ordinarily of very small size and accordingly the diameters of portions 43 and 44 are likewise small so that it is difficult to provide swirl slots 45 large enough to keep the fluid flow velocity and related pressure down to desired levels at high flow rates. The taper of portion 44, however, will obviously permit additional fluid flow over the tops of the spiral grooves 45 to achieve a modulated reduction of velocity and pressure when the valve member has been reciprocated to shift cylindrical portion 43 beyond the valve seat. Of course, the degree of taper or slope of portion 44 toward annular groove 42 largely determines the relative volumes within and outside grooves 45 in this region, a change of a few degrees in such taper having a substantial effect in this respect. Ordinarily, such tapered portion will be of considerably greater axial extent than the cylindrical portion 43 as shown in Fig. 5, in such instance about three times longer, the magnitude of the taper being approximately ten degrees in this typical example. Obviously, a wide range of pressure versus flow rate may be obtained by varying such taper or curving surface 44 as desired.

Also, if desired, the valve member may be permitted a sufficient extent of axial reciprocation so that at the full capacity position the annular groove 42 will open directly into the spin chamber 7, thereby reducing the swirl motion substantially to zero.

As indicated in Fig. 7, the pressure versus flow performance characteristics of the nozzle utilizing the Fig. 5 type of valve member may be contrasted with the corresponding performance achieved with the Fig. 1 form of valve member, it being noted that the operating pressure can be carried at a higher value at low flow rates and yet obtain low pressures at high flow rates. This ability to use high pressure at low flow rates is very desirable as above pointed out when good atomization of high viscosity fuel is required.

It will be seen from the foregoing that I have achieved the several objects of my invention and have provided a form of nozzle which is relatively simple and inexpensive to produce, particularly in contrast to the better examples of closed orifice type nozzles. In both the Fig. 2 and Fig. 5 embodiments the helical swirl slots 9 and 45 respectively are arranged so as to present varying amounts of area at a release line directly into the secondary spin chamber and on a schedule related to inlet pressure. This novel arrangement is of particular importance in enabling me to achieve the objectives noted above.

The graphs, Figs. 4 and 7, bear legends "FF VS ($P_1-P_2$)" which, of course, are to be read "fluid flow versus the difference between the nozzle inlet pressure and the nozzle outlet pressure (beyond the exit orifice)."

All parts of the nozzles will ordinarily be made of stainless steel.

Referring now to Fig. 8, the valve member there shown is identical to that of Fig. 5 except that the tapered helical grooves 45 are omitted so that the sloping (ordinarily frusto-conical) surface 44A is uninterrupted. If desired, such sloping surface may commence at valve face 13 to obtain more immediate increase in the fluid flow as the valve member reciprocates. Of course, the swirl effect of grooves 45 is lost but this is not always essential (although usually still preferred) when the spring is biased to permit opening only after a relatively high proportion of rated flow has already been achieved.

Other modes of applying the principle of the invention may be employed, change being made as regards the details described, provided the features stated in any of the following claims or the equivalent of such be employed.

I therefore particularly point out and distinctly claim as my invention:

1. In a nozzle having a cylindrical hollow body portion with an inlet end and a co-axial exit orifice in the other end thereof, and a swirl chamber immediately upstream of such orifice; a cylindrical valve member fitted within said body portion for reciprocation therein, one end of said member protruding into said swirl chamber, a peripheral valve face on said valve member within said swirl chamber adapted to seat against said body portion when said valve member is fully reciprocated away from said exit orifice, a plurality of similar uniformly arranged helical grooves in the outer surface of said valve member extending from the inlet end of said valve member to said valve face, said grooves tapering toward said valve face in their adjacent end portions, an axial extension of said valve member of substantially less diameter than said swirl chamber projecting toward said exit orifice, said valve face being of smaller diameter than said swirl chamber, an inner annular chamber within said valve member, radial passages leading from each of said helical grooves to said annular chamber at circumferentially spaced points equidistant from said valve face, swirl slots leading from said annular chamber to an inner swirl chamber within said valve member, a passage leading from said inner swirl chamber through said extension to a co-axial orifice in the end of the latter, and resilient means biased normally to hold said valve member seated so that fluid flow may be only through said passage in said extension until inlet pressure rises to a figure sufficient to unseat said peripheral valve face.

2. The nozzle of claim 1 wherein said resilient means comprises a coil spring seated within said body, a flexible rod secured at one end to said valve member and extending co-axially thereof and of said spring, and means releasably securing the other end of said rod to said spring to hold the latter in compressed condition when said valve face is seated.

3. In a nozzle having a cylindrical hollow body portion with an inlet end and a co-axial exit orifice in the other end thereof, and a swirl chamber immediately upstream of such orifice; a cylindrical valve member fitted within said body portion for reciprocation therein, one end of said member protruding into said swirl chamber, a peripheral valve face on said valve member within said swirl chamber adapted to seat against said body portion when said valve member is fully reciprocated away from said exit orifice, a plurality of similar uniformly arranged helical grooves in the outer surface of said valve member communicating with the inlet end of said nozzle and extending to said valve face, said grooves tapering toward said valve face, said valve face being of less diameter than said swirl chamber, and resilient means biased normally to hold said valve member seated until inlet pressure rises to a figure sufficient to unseat said peripheral valve face.

4. The nozzle of claim 3, wherein said outer surface of said valve member having said tapering grooves therein is cylindrical adjacent said peripheral valve face and then tapers toward the inlet end of said nozzle.

5. The nozzle of claim 3, wherein said outer surface of said valve member having said tapering grooves therein is cylindrical adjacent said peripheral valve face and then frusto-conical tapering toward the inlet end of said nozzle.

6. In a nozzle having a cylindrical hollow body portion with an inlet end and a co-axial exit orifice in the other end thereof, and a swirl chamber immediately upstream of such orifice; a cylindrical valve member fitted within said body portion for reciprocation therein, one end of said member protruding into said swirl chamber, a peripheral valve face on said valve member within said swirl chamber adapted to seat against said body portion when said valve member is fully reciprocated away from said exit orifice, said valve face being of less diameter than said swirl chamber, the outer surface of said cylindrical valve member adjacent said valve face being truly cylindrical but then tapering toward the inlet end of said nozzle.

7. The nozzle of claim 6 wherein said tapering and cylindrical surfaces are grooved with grooves leading to said valve face for additional fluid flow.

8. In a nozzle having a body portion with a bore therein, said bore having an inlet end, an exit orifice at the other end co-axial with said bore, a swirl chamber upstream of said orifice and communicating with said bore, and a valve member fitted for reciprocation in said bore, one end of said valve member protruding into said swirl chamber; an annular groove in the outer surface of said valve member intermediate its ends, a plurality of grooves in said valve member leading from the inlet end thereof to said annular groove, a peripheral valve face on said valve member within said swirl chamber adapted to seat when said valve member is fully reciprocated away from said exit orifice, said valve face being of smaller diameter than said swirl chamber, grooves in the outer surface of said valve member extending from said annular groove to said valve face, said latter grooves being angularly disposed relative to the axis of said valve member, an inner chamber within said valve member, passages leading from said annular groove to said inner chamber, an extension of said valve member in said swirl chamber co-axial therewith, a passage leading from said inner chamber through said extension to an orifice at the end of the latter, and swirl slots intermediate said inner chamber and passage in said extension effective to impart a swirling motion to fluid flow therethrough, and resilient means biasing said valve member to seat the same.

9. The nozzle of claim 8 wherein said grooves in said valve member leading from the inlet end thereof to said annular groove are substantially wider than the intervening lands.

10. The nozzle of claim 8 wherein said grooves in said valve member leading from the inlet end thereof to said annular groove are substantially wider than the intervening lands and parallel to the axis of said valve member.

11. The nozzle of claim 8 in which the surface of said valve member intermediate said valve face and said annular groove is tapered toward said latter groove.

12. The nozzle of claim 8 in which said angular grooves are helically disposed and taper toward said valve face.

13. The nozzle of claim 8 wherein said extension of said valve member protrudes through said first-named exit orifice when said valve member is seated, being laterally spaced from said first-named exit orifice to provide an annular clearance therebetween.

14. In a nozzle having a fluid inlet end, an exit orifice end, and a swirl chamber upstream of such orifice; a valve member mounted for reciprocation toward and away from such orifice, generally helical grooves in the outer surface of said valve member adapted to conduct fluid from the inlet end of said nozzle to said swirl chamber, a valve face on said valve member adapted to seat to prevent such fluid flow, a slender flexible rod rigidly axially secured to said valve member and extending therefrom toward such inlet end of said nozzle, and resilient means secured to said rod to tension the latter and seat said valve member, said rod being of sufficient length to twist appreciably under the torsional forces imposed by fluid flow through said helical grooves when said valve member is unseated.

15. In a valve having a reciprocable valve member with generally helical passages therein to deliver a swirling fluid flow when unseated, a slender flexible rod rigidly axially secured to said valve member and extending therefrom toward the fluid inlet, and resilient means engaging said rod effective to tension the latter and seat said valve member, said rod being of sufficient length to twist appreciably under the torsional forces imposed by fluid flow through said helical passages when said valve member is unseated.

16. In a nozzle having a fluid inlet end, an exit orifice end, and a swirl chamber upstream of such orifice; a valve member mounted for reciprocation toward and away from such orifice and having a portion protruding into said swirl chamber, a peripheral valve face on said valve member within said swirl chamber of smaller diameter than said swirl chamber adapted to seat when said valve member is fully reciprocated away from such orifice, said valve member having generally helical grooves in its outer surface in advance of said valve face to impart a swirling flow to fluid approaching the latter when said valve face is unseated, and resilient means biased to hold said valve face seated until a predetermined inlet pressure has been reached; said grooves tapering toward said valve face.

17. In a nozzle having a fluid inlet end, an exit orifice end, and a swirl chamber upstream of such orifice; a valve member mounted for reciprocation toward and away from such orifice and having a portion protruding into said swirl chamber, a peripheral valve face on said valve member within said swirl chamber of smaller diameter than said swirl chamber adapted to seat when said valve member is fully reciprocated away from such orifice, said valve member having generally helical grooves in its outer surface in advance of said valve face to impart a swirling flow to fluid approaching the latter when said valve face is unseated, and resilient means biased to hold said valve face seated until a predetermined inlet pressure has been reached; said grooves tapering toward said valve face, and the surface of said valve member in which said grooves are formed tapering toward the inlet end of said nozzle.

18. In a nozzle having a fluid inlet end, an exit orifice end, and a swirl chamber upstream of such orifice; a valve member mounted for reciprocation toward and away from such orifice and having a portion protruding into said swirl chamber, a peripheral valve face on said valve member within said swirl chamber of smaller diameter than said swirl chamber adapted to seat when said valve member is fully reciprocated away from such orifice, said valve member having generally helical grooves in its outer surface in advance of said valve face to impart a swirling flow to fluid approaching the latter when said valve face is unseated, and resilient means biased to hold said valve face seated until a predetermined inlet pressure has been reached; the surface of said valve member tapering toward the inlet end of said nozzle.

19. In a nozzle having a fluid inlet end, an exit orifice end, and a swirl chamber upstream of such orifice; a valve member mounted for reciprocation toward and away from such orifice and having a portion protruding into said swirl chamber, a peripheral valve face on said valve member within said swirl chamber of smaller diameter than said swirl chamber adapted to seat when said valve member is fully reciprocated away from such orifice, said valve member having generally helical grooves in its outer surface in advance of said valve face to impart a swirling flow to fluid approaching the latter when said valve face is unseated, and resilient means biased to hold said valve face seated until a predetermined inlet pressure has been reached; said valve member being provided with a passage therethrough having an exit orifice co-axial with said first exit orifice effective to afford restricted fluid flow even when said valve face is seated.

20. In a nozzle having a fluid inlet end, an exit orifice end, and a swirl chamber upstream of such orifice; a valve member mounted for reciprocation toward and away from such orifice and having a portion protruding into said swirl chamber, a peripheral valve face on said valve member within said swirl chamber of smaller diameter than said swirl chamber adapted to seat when said valve member is fully reciprocated away from such orifice, said valve member having generally helical grooves in its outer surface in advance of said valve face to impart a swirling flow to fluid approaching the latter when said valve face is unseated, and resilient means biased to hold said valve face seated until a predetermined inlet pressure has been reached; said valve member being provided with a passage therethrough having an exit orifice co-axial with said first exit orifice to afford restricted fluid flow even when said valve face is seated, said passage within said valve member including swirl producing means effective to impart a swirling motion to the fluid passing therethrough and discharged from said co-axial exit orifice.

21. In a valve adapted to deliver a swirling fluid flow, a bore, a valve member fitted for reciprocation in said bore, a helical groove in the outer surface of said valve member communicating with the inlet side of said valve, a poppet type valve face on said valve member at the outlet end thereof, and resilient means biasing said valve member normally to seat said valve face to prevent fluid flow through said groove; said groove tapering toward said valve face.

22. In a valve adapted to deliver a swirling fluid flow, a bore, a valve member fitted for reciprocation in said bore, a helical groove in the outer surface of said valve member communicating with the inlet side of said valve, a poppet type valve face on said valve member at the outlet end thereof, and resilient means biasing said valve member normally to seat said valve face to prevent fluid flow through said groove; said valve member tapering toward the inlet end, affording increasing fluid flow with increased reciprocation of said valve member.

23. In a valve adapted to deliver a swirling fluid flow, a bore, a valve member fitted for reciprocation in said bore, a helical groove in the outer surface of said valve member communicating with the inlet side of said valve, a poppet type valve face on said valve member at the outlet end thereof, and resilient means biasing said valve member normally to seat said valve face to prevent fluid flow through said groove; said groove tapering toward said valve face, and said valve member tapering toward the inlet end, affording increasing fluid flow with increased reciprocation of said valve member.

24. In a nozzle having a body portion with a bore therein, said bore having an inlet end, an exit orifice at the other end co-axial with said bore, a swirl chamber upstream of said orifice and communicating with said bore, and a valve member fitted for reciprocation in said bore, one end of said valve member protruding into said swirl chamber; a recess in the outer surface of said valve member intermediate its ends, a plurality of grooves in said valve member leading from the inlet end thereof to said recess, a peripheral valve face on said valve member within said swirl chamber adapted to seat when said valve member is fully reciprocated away from said exit orifice, said valve face being of smaller diameter than said swirl chamber, grooves in the outer surface of said valve member extending from said recess to said valve face, said latter grooves being angularly disposed relative to the axis of said valve member, an inner chamber within said valve member, passages leading from said recess to said inner chamber, an extension of said valve member in said swirl chamber co-axial therewith, a passage leading from said inner chamber through said extension to an orifice at the end of the latter, and swirl slots intermediate said inner chamber and passage in said extension effective to impart a swirling motion to fluid flow therethrough, and resilient means biasing said valve member to seat the same.

25. In a nozzle having a body portion with a bore therein, said bore having an inlet end, an exit orifice at the other end co-axial with said bore, a swirl chamber upstream of said orifice and communicating with said bore, and a valve member fitted for reciprocation in said bore, one end of said valve member protruding into said swirl chamber; a peripheral valve face on said valve member within said swirl chamber adapted to seat when said valve member is fully reciprocated away from said exit orifice, said valve face being of smaller diameter than said swirl chamber, grooves in the outer surface of said valve member adapted to conduct fluid to said valve face, a co-axial protuberance on said valve member within said swirl chamber and projecting through and beyond said exit orifice with lateral clearance in all positions of said valve member, and an inner passage through said valve member and protuberance to the outer end of the latter for passage of fluid therethrough and ejection from the end of said protuberance clear of any fluid delivered through said exit orifice upon reciprocation of said valve member.

26. In a nozzle having a body portion with a bore therein, said bore having an inlet end, an exit orifice at the other end co-axial with said bore, a swirl chamber upstream of said orifice and communicating with said bore, and a valve member fitted for reciprocation in said bore, one end of said valve member protruding into said swirl chamber; a peripheral valve face on said valve member within said swirl chamber adapted to seat when said valve member is fully reciprocated away from said exit orifice, said valve face being of smaller diameter than said swirl chamber, a fluid passage for fluid from said inlet end to said valve face, a co-axial protuberance on said valve member projecting through said swirl chamber, said protuberance having a substantially smaller outer diameter than the inner diameter of said exit orifice, and a passage through said valve member and protuberance to the outer end of the latter communicating with said inlet end of said bore.

References Cited in the file of this patent

UNITED STATES PATENTS

| | | |
|---|---|---|
| 1,096,585 | Yost et al. | May 12, 1914 |
| 1,327,744 | Tartrais | Jan. 13, 1920 |
| 1,435,778 | Williams | Nov. 14, 1922 |
| 1,609,578 | Scott | Dec. 7, 1926 |
| 1,755,192 | Scott | Apr. 22, 1930 |
| 1,876,980 | Lentell | Sept. 13, 1932 |
| 2,233,770 | Campbell | Mar. 4, 1941 |
| 2,656,218 | Campbell | Oct. 20, 1953 |
| 2,749,182 | Campbell | June 5, 1956 |

OTHER REFERENCES

Ser. No. 285,916, Schwaiger et al. (A. P. C.), published June 8, 1943.